United States Patent
Lee (10) Patent No.: US 8,284,412 B2
(45) Date of Patent: Oct. 9, 2012

(54) IMAGE FORMING APPARATUS TO SELECTIVELY PERFORM AUTO COLOR REGISTRATION AND CONTROL METHOD THEREOF

(75) Inventor: Hyeon-seung Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 946 days.

(21) Appl. No.: 11/953,121

(22) Filed: Dec. 10, 2007

(65) Prior Publication Data

US 2008/0137117 A1    Jun. 12, 2008

(30) Foreign Application Priority Data

Dec. 11, 2006  (KE) .................. 10-2006-0125682

(51) Int. Cl.
*G06F 3/12* (2006.01)
*G03G 15/01* (2006.01)

(52) U.S. Cl. ......... 358/1.13; 358/1.1; 399/301; 347/116

(58) Field of Classification Search .............. 358/1.13, 358/1.1; 399/301; 347/116
See application file for complete search history.

(56) References Cited

U.S. PATENT DOCUMENTS

| | | | |
|---|---|---|---|
| 6,280,105 B1 * | 8/2001 | Iida | 400/74 |
| 6,345,117 B2 * | 2/2002 | Klassen | 382/167 |
| 2002/0041389 A1 * | 4/2002 | Noda | 358/1.14 |
| 2004/0136025 A1 * | 7/2004 | Moriyama et al. | 358/1.14 |
| 2004/0253013 A1 * | 12/2004 | Furukawa | 399/49 |
| 2005/0093956 A1 * | 5/2005 | Egan | 347/171 |
| 2006/0008285 A1 * | 1/2006 | Yoshizuka et al. | 399/49 |
| 2006/0115303 A1 * | 6/2006 | Kang et al. | 399/301 |

FOREIGN PATENT DOCUMENTS

KR    2005-53310    6/2005

OTHER PUBLICATIONS

Korean Office Action issued Jun. 1, 2011 in corresponding Korean Patent Application 10-2006-0125682.
Korean Office Action issued Aug. 31, 2011 in corresponding Korean Patent Application 10-2006-0125682.

* cited by examiner

*Primary Examiner* — Charlotte M Baker
(74) *Attorney, Agent, or Firm* — Staas & Halsey LLP (57) ABSTRACT

An image forming apparatus to selectively perform an auto color registration operation, the apparatus including: a printing unit, which forms single-color images, based on printing data, and transfers the images to a printing medium to form a printed image; and a controller which prevents the printing unit from performing the auto color registration operation on the printing data, if the printing data relates a monochromatic printing mode.

19 Claims, 4 Drawing Sheets

FIG. 3

IMAGE FORMING APPARATUS TO SELECTIVELY PERFORM AUTO COLOR REGISTRATION AND CONTROL METHOD THEREOF

CROSS-REFERENCE TO RELATED APPLICATION

This application claims the benefit of Korean Application No. 2006-125682, filed on Dec. 11, 2006, in the Korean Intellectual Property Office, the disclosure of which is incorporated herein by reference.

BACKGROUND OF THE INVENTION

1. Field of the Invention

Aspects of the present invention relate to an image forming apparatus and a control method thereof, and more particularly, to an image forming apparatus to selectively perform an auto color registration operation, and a control method thereof.

2. Description of the Related Art

An image forming apparatus forms single-color images of a desired color (e.g., yellow, magenta, cyan, and black, etc.) on a photoconductive drum, or a photoconductive belt, and overlaps the single-color images on a printing medium. The image forming apparatus can be, for example, a laser printer, a scanner, a copier, or a multifunctional device.

The image forming apparatus overlaps the single-color images, on a desired location of a printing medium, to print a color image. The image forming apparatus performs a color registration process, to insure that the single-color images are properly overlapped/positioned. The color registration process can be an auto color registration process, or a manual color registration process. The auto color registration process can be performed before or after the printing. The image forming apparatus performs the auto color registration process, based on a predetermined auto color registration condition.

The auto color registration condition includes: 1) a case where a fusing temperature, to fuse of an image to the printing medium, does not correspond to a reference temperature, after the image forming apparatus is powered on; 2) a case where the fusing temperature does not correspond to the reference temperature, when a printing unit is in a print-ready state; 3) a case where the printing unit has printed more than a predetermined number of sheets; 4) a case where a consumable material is replaced; and 5) a case where a casing of the image forming apparatus is opened and then closed. That is, the image forming apparatus analyzes an image printed by a photoconductive medium, when an auto color registration condition is satisfied, and performs the auto color registration process, by controlling a light scan unit (LSU), when the image is distorted. In this case, the image forming apparatus consumes a developing material, by performing the auto color registration.

The conventional image forming apparatus may unnecessarily perform the auto color registration process, thereby wasting a developing material, and unnecessarily consuming power. However, the conventional image forming apparatus always performs the auto color registration process, when an auto color registration condition is satisfied.

The above information disclosed in this Background section is only for enhancement of understanding of the background of the invention and therefore it may contain information that does not form the prior art that is already known in this country to a person of ordinary skill in the art.

SUMMARY OF THE INVENTION

Aspects of the present invention provide an image forming apparatus, and a control method thereof, to conserve a developing material, and to prevent unnecessary power consumption.

Aspects of the present invention relate to providing an image forming apparatus to selectively perform an auto color registration operation, the image forming apparatus including: a printing unit which forms one or more single-color images based on printing data, and transfers the single-color images to a printing medium, to form an finished image; and a controller to selectively prevent the printing unit from performing the auto color registration operation for the printing data, if the printing data relates to a monochromatic printing mode.

According to aspects of the present invention, the controller may control the printing unit to perform the auto color registration operation, if the printing data does not relate to the monochromatic printing mode, and an auto color registration condition is satisfied.

According to aspects of the present invention, the auto color registration condition may include at least one of: a case where a fusing temperature, to fuse the single-color images to the printing medium, does not correspond to a reference temperature after power on; a case where the fusing temperature does not correspond to the reference temperature, when the printing unit is in a print-ready state; a case where the printing unit has printed more than a predetermined number of printing medium sheets; a case that a consumable material is replaced; and a case where a casing of the image forming apparatus is opened, and then closed.

According to aspects of the present invention, the auto color registration operation may include transferring and overlapping one or more single-color images, at a predetermined location, and adjusting the relative locations, to which one or more of the single-color images will be overlapped, if one or more of the single-color images are transferred to an unintended location.

According to aspects of the present invention, the adjusting of the relative locations, where the one or more single-color images will be transferred, may include adjusting at least one of a main scanning direction, to transfer the single-color image, and a transferring start point thereof.

According to aspects of the present invention, the controller may perform the auto color registration operation according to user's requests.

According to aspects of the present invention, the printing unit may employ a single pass method.

Another aspect of the present invention provides a method of controlling an image forming apparatus to selectively perform an auto color registration operation, and including a printing unit that transfers an image, based on printing data, to a printing medium. The method includes: determining whether the printing data relates to a monochromatic printing mode; and controlling the printing unit not to perform the auto color registration operation on the printing data, if the printing data relates to the monochromatic printing mode.

According to aspects of the present invention, the method may further include: determining whether the image forming apparatus satisfies an auto color registration condition; and performing the auto color registration operation, if the printing data does not relate to the monochromatic printing mode and the auto color registration condition is satisfied.

According to aspects of the present invention, the auto color registration condition may correspond to at least one of: a case where a fusing temperature, to fuse of an image to the printing medium, does not correspond to a reference temperature after the printing unit is powered on; a case where the fusing temperature does not correspond to the reference temperature, when the printing unit is in the print-ready state; a case where the printing unit has printed more than a predetermined number of sheets; a case that a consumable material is replaced, and a case where the image forming apparatus is partially opened and then closed.

According to aspects of the present invention, the performing of the auto color registration operation may include transferring single-color images to a predetermined location, and adjusting the relative locations of one or more of the single color images, if one or more of the single-color images is transferred to an unintended location.

According to aspects of the present invention, the adjusting of the relative locations may include adjusting at least one of a main scanning direction, to transfer the image, and a transferring start point.

According to aspects of the present invention, the auto color registration operation may be performed according to a user's request.

According to aspects of the present invention, the printing unit may employ a single pass method.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the exemplary embodiments of the present invention, examples of which are illustrated in the accompanying drawings, wherein like reference numerals refer to like elements throughout. The exemplary embodiments are described below, in order to explain the aspects of the present invention by, referring to the figures.

Figure 1:
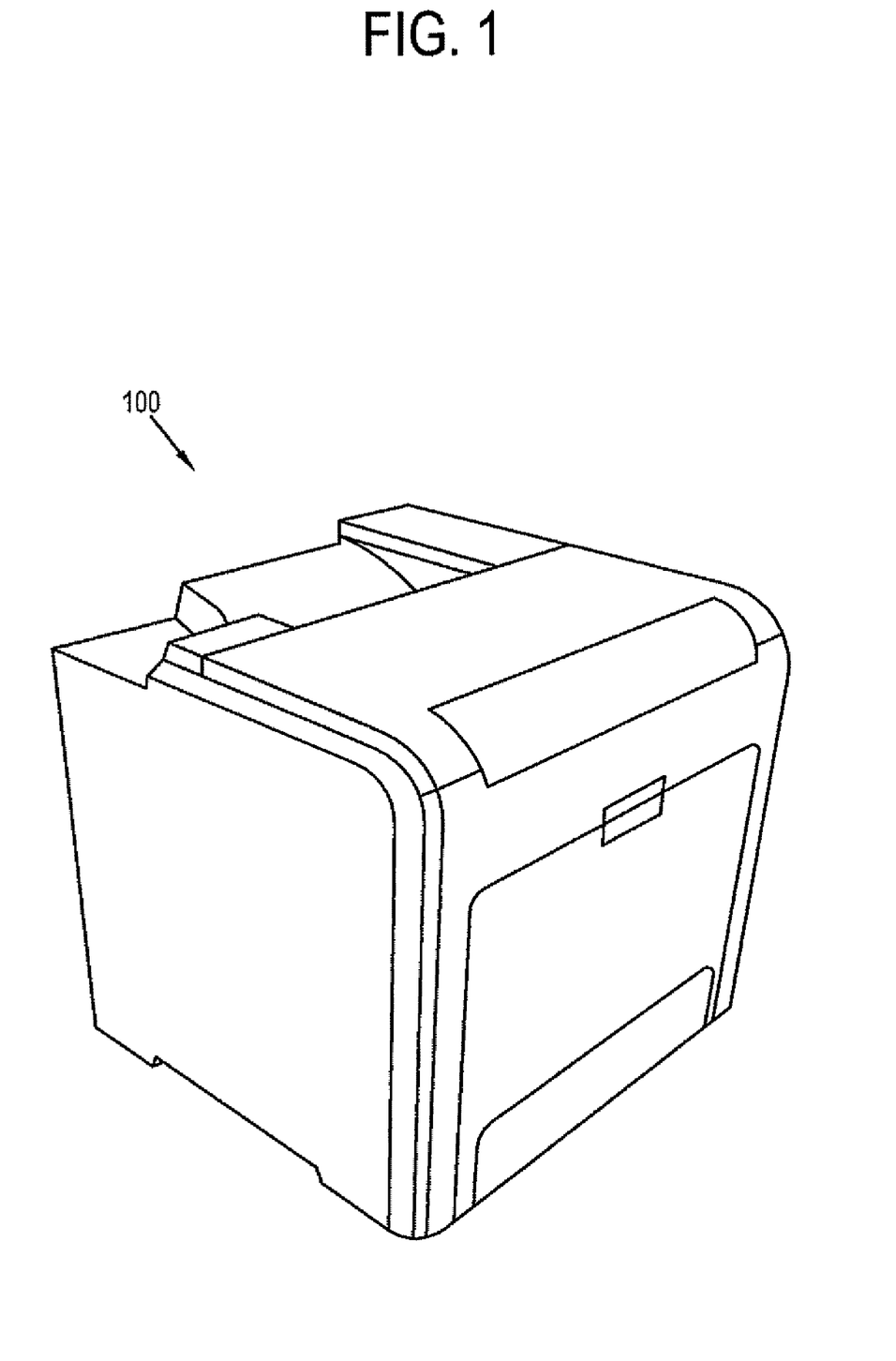
FIG. 1 is a perspective view of an image forming apparatus, according to an exemplary embodiment of the present invention.

FIG. 1 is a perspective view of an image forming apparatus 100, according to an exemplary embodiment of the present invention. As shown in FIG. 1, the image forming apparatus 100 receives printing data from an external device, such as a computer (not shown), and prints an image on a printing medium (not shown), based on the received printing data. Herein, the image forming apparatus 100 may be a color-image forming apparatus.

Figure 2:
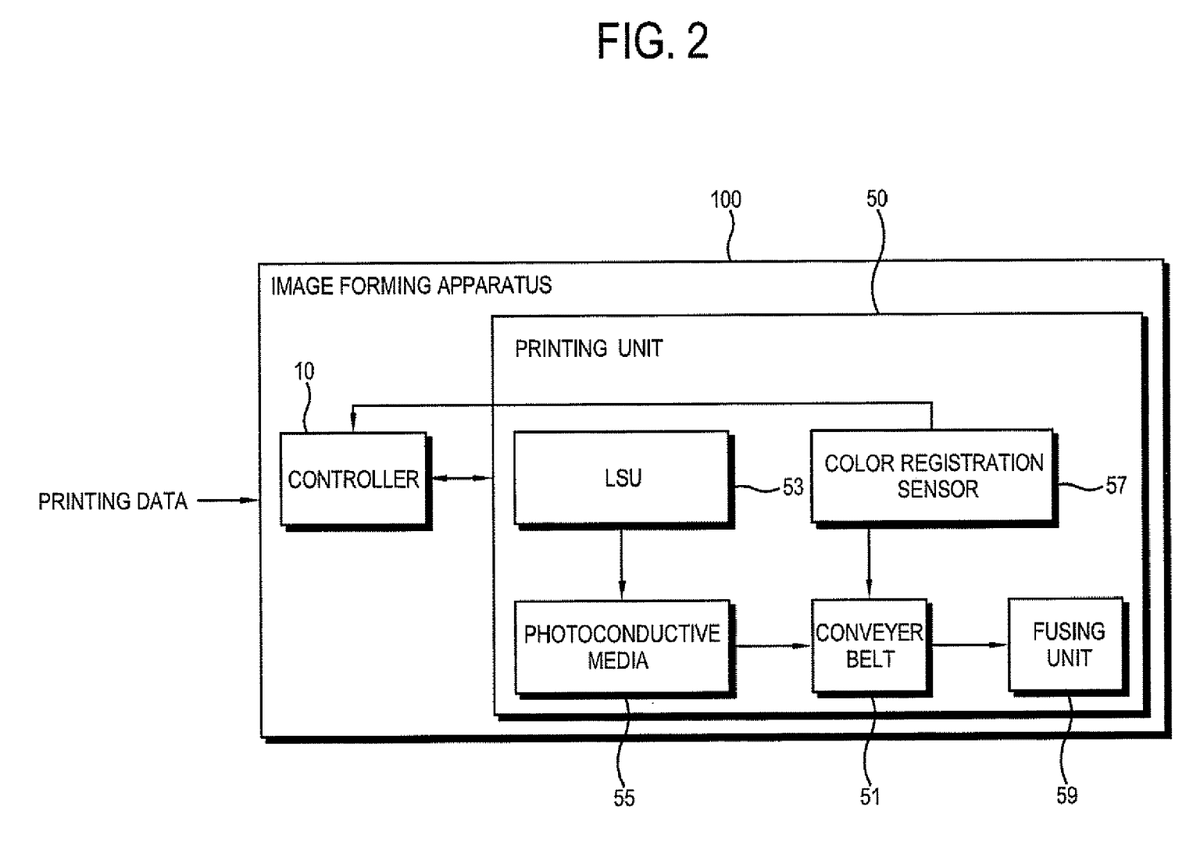
FIG. 2 is a block diagram of an image forming apparatus, according to an exemplary embodiment of the present invention.

FIG. 2 is a block diagram of the image forming apparatus 100, according to the exemplary embodiment of the present invention. As shown in FIG. 2, the image forming apparatus 100 includes: a printing unit 50 that prints an image on a printing medium, based on printing data, by employing a single pass method; and a controller 10 that controls the printing unit 50. The printing unit 50 includes a light scanning unit (LSU) 53, a photoconductive media 55, a conveyer belt 51, and a fusing unit 59. A separate photoconductive media 55 can be provided for each color of toner used in the image forming apparatus 100, i.e., for each single-color image formed by the image forming apparatus 100. The image forming apparatus 100 includes yellow, cyan, magenta, and black toner, and accordingly, the printing unit 50 includes four photoconductive media 55. The number of photoconductive media 55 can be varied, and is not restricted to any particular number.

The controller 10 controls the printing unit 50, to print an image on a printing medium, based on printing data received from an external device, such as a computer (not shown). Herein, a "printing medium" or "printing media" refers to any printable medium, for example, paper, transparency sheets, or the like.

The printing unit 50 picks up the printing medium on the conveyer belt 51, according to the control of the controller 10. The printing medium is transferred through a printing path, by the conveyer belt 51. The LSU 53 scans light to the photoconductive media 55. The photoconductive media 55 receives a developing material (toner) stored in a developing material storage unit 25. The toner is adhered to a portion of the photoconductive media 55 where the light is scanned, by a rotational motion, and forms a single-color image on the photoconductive media 55.

When the printing medium is transferred through the printing path, photoconductive media 55 each transfers a single-color image to the printing medium. In this case, a plurality of developing material storage units 25 are provided for the single-color images. The transfer operation overlaps the single-color images on the printing medium, to form a color image. The color image (hereinafter the image) is fused to the printing medium, by the fusing unit 59, which generates a high temperature and pressure.

The controller 10 controls the printing unit 50 to perform an auto color registration, so as to prevent color registration distortion (a misalignment of the overlapped single-color images). The controller 10 determines whether to perform the auto color registration, according to whether one or more of the predetermined auto color registration conditions is satisfied. The controller 10 controls the printing unit 50 to perform the auto color registration when at least one of the registration conditions is satisfied.

The controller 10 determines whether the printing data, input from the external device (not shown), relates to a monochromatic printing mode. That is, the controller 10 determines whether the printing data relates to the monochromatic printing mode, or to a color printing mode. The controller 10 prevents the printing unit 50 from performing the auto color registration, when the printing data relates to the monochromatic printing mode. Herein, when the printing data is referred to as relating to a monochromatic printing mode, the printing data relates to a printing operation where an image or images, composed of a single color, for example a grayscale image, are printed. The color printing mode refers to a printing operation where a color image or images, composed of multiple colors, are printed.

In addition, the controller 10 controls the printing unit 50 to perform the auto color registration, when the printing data does not relate to the monochromatic printing mode, and at least one of the predetermined auto color registration conditions is satisfied.

The predetermined auto color registration condition includes at least one of: a case where a fusing temperature to fuse an image on the printing medium does not correspond to a reference temperature, after the image printing apparatus is turned on; a case where the fusing temperature does not correspond to the reference temperature when the printing unit 50 is in a print-ready state; a case where the printing unit 50 has printed more than a predetermined amount of the printing medium (e.g., 200 sheets); a case where a consumable material is replaced; and a case where a casing (not shown) of the image forming apparatus 100 is opened or partially opened, and then closed. That is, the controller 10 controls the printing unit 50 to perform the auto color registration, if at least one of the above cases is satisfied.

The auto color registration is performed by the printing unit 50. The printing unit 50 controls the LSU 53 to scan light to the photoconductive media 55. A single-color image is formed on a light-scanned portion of the photoconductive media 55, and the single-color image is transferred to a predetermined location of the conveyer belt 51, by a rotational motion of the conveyer belt 51. The above process is performed for each color (i.e., yellow, magenta, cyan, and black), such that the single-color images are overlapped, and then transferred onto the printing medium, to form a final image.

A color registration sensor 57 detects an image transferred on the conveyer belt 51. The color registration sensor 57 scans the image, and transmits the scanned image to the controller 10. The controller 10 compares the scanned image with a predetermined reference image, and determines whether the scanned image is distorted. When the controller 10 determines that the scanned image is distorted, the controller 10 controls the printing unit 50 to perform the color registration.

The printing unit 50 controls the LSU 53 to perform the color registration, by controlling the light scanned to the photoconductive media 55, in a main scanning direction, and/or controlling a scanning start time for the light scanning. The printing unit 50 can erase the scanned image from a memory storing the scanned image.

Therefore, the controller 10 may set the color registration to be automatically performed, when the printing data received from the external device does not relate to the monochromatic printing mode. In addition, the controller 10 may control the printing unit 50 to perform the auto color registration, when the printing data does not relate to the monochromatic printing mode, and the predetermined auto color registration condition is satisfied. That is, when the printing data relates to the monochromatic printing mode, the controller 10 controls the auto color registration not to be performed, so as to conserve the developing material (toner), used for the auto color registration.

The controller 10 determines whether the auto color registration condition is satisfied, and stores a flag in a predetermined memory location (not shown), when the auto color registration condition is satisfied. The flag may have a value of 0 or 1, where 0 denotes "false" and 1 denotes "true". An initial value of the flag can be set to "false". "False" indicates that the auto color registration condition is not satisfied. "True" indicates that the auto color registration condition is satisfied.

When it is determined that the auto color registration condition is satisfied, the controller 10 stores the flag with a true value. Then, the controller 10 determines whether the printing data, received from the external device, relates to the monochromatic printing mode. When the printing data relates to the monochromatic printing mode, the controller 10 controls the printing unit 50 not to perform the auto color registration, even though the auto color registration condition is satisfied. However, when the printing data does not relate to the monochromatic printing mode, and the flag is true, the controller 10 controls the printing unit 50 to perform the auto color registration. The controller 10 initializes the flag to false, after the printing unit 50 performs the auto color registration. The controller 10 may optionally control the printing unit 50 to perform the auto color registration, according to a user's request.

The controller 10 controls the printing unit 50 to perform the auto color registration, according to a type of printing data, to conserve the developing material that would be used during the auto color registration. In addition, the image forming apparatus 100 may include a display window (not shown). The display window displays a predetermined message, to inform a user of the current status of the image forming apparatus 100. The user may enter a predetermined operation command, through a user input button (not shown) provided in the casing.

Figure 3:
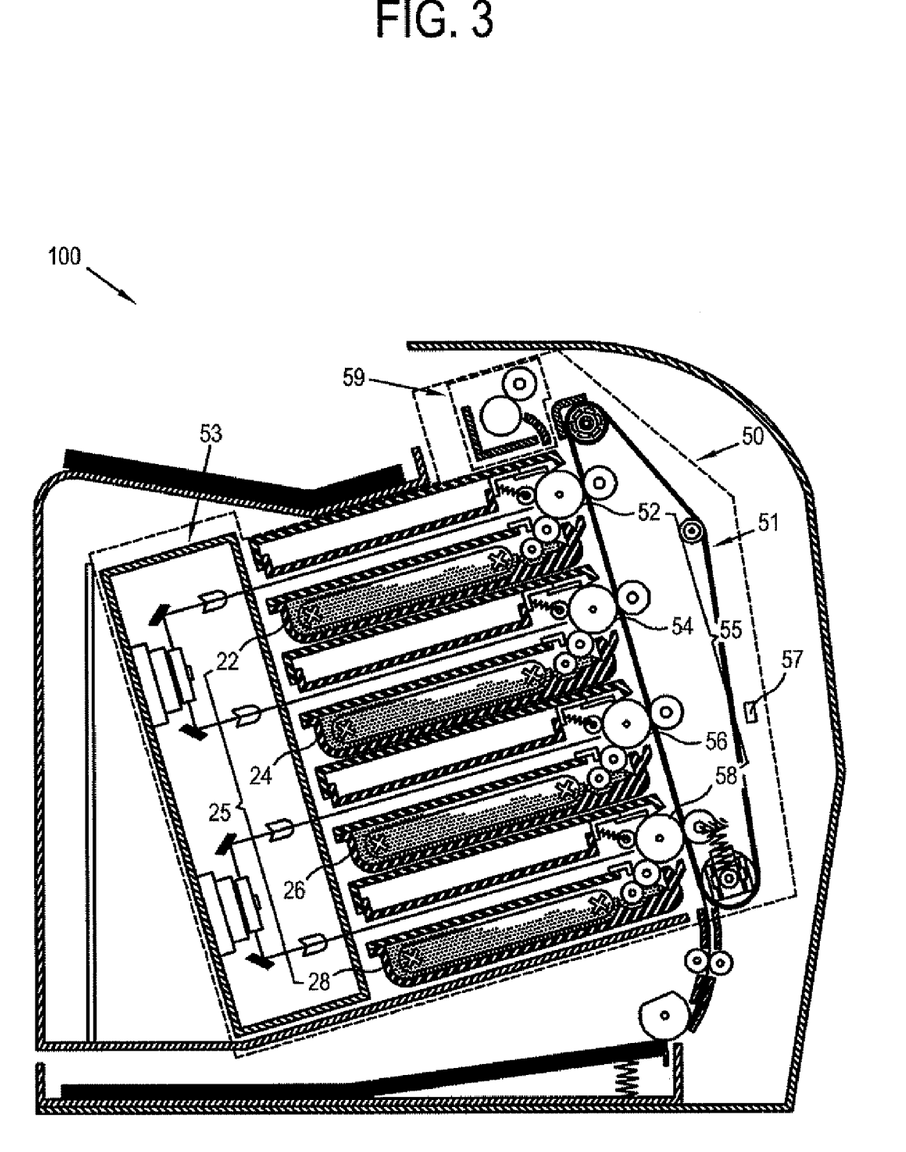
FIG. 3 is a vertical sectional view of the image forming apparatus, according to the exemplary embodiment of the present invention.

FIG. 3 is a vertical sectional view of the image forming apparatus 100, according to the exemplary embodiment of the present invention. As shown in FIG. 3, the image forming apparatus 100 includes a printing unit 50 disposed inside a casing.

The printing unit 50 includes a printing belt 51, a light scan unit (LSU) 53, photoconductive media 55, and a fusing unit 59. The printing unit 50 employs the single pass method. The printing medium is loaded on the printing belt 51, by a pickup roller, and passes through a printing path, according to the control of the controller 10. In this case, the printing unit 50 controls the LSU 53 to scan light, based on the printing data, so as to form single-color images on the photoconductive media 55. The single-color images are formed from yellow, magenta, cyan, and black toners. The single-color images can be overlapped with each other on the printing medium.

The printing medium passes through the printing path, on the printing belt 51, and the photoconductive media 55 transfer the single-color images formed thereon, to the printing medium. Herein, the photoconductive media 55 include photoconductive media 52, 54, 56, and 58 for each toner color. After the respective photoconductive media 55 transfer images, and the printing medium passes the printing path, the fusing unit 59 applies high temperature and high pressure to the printing medium, so as to fuse an image on the printing medium.

Figure 4:
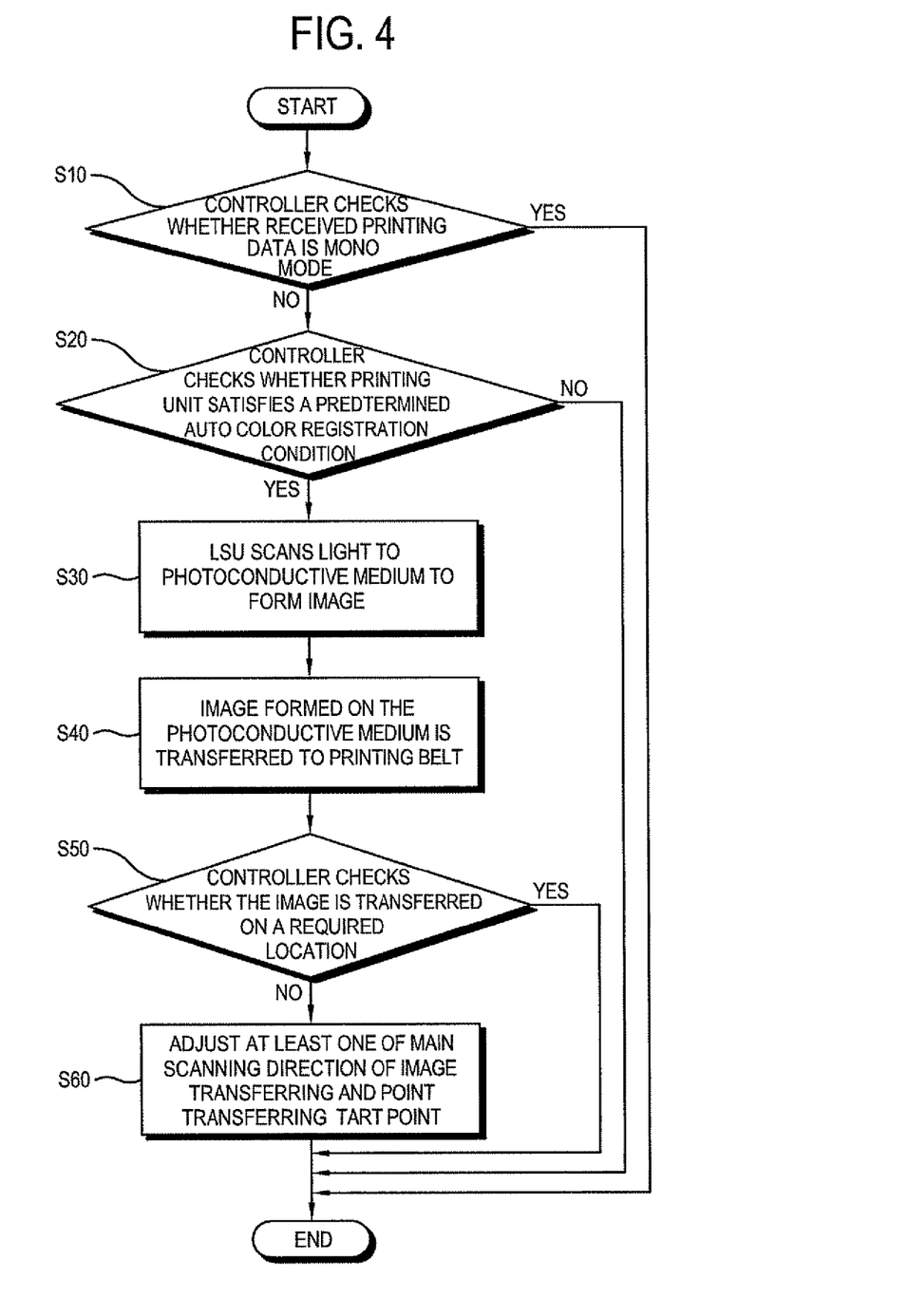
FIG. 4 is a flowchart of a method of controlling an image forming apparatus, according to aspects of the present invention.

FIG. 4 is a flowchart of a control method of the image forming apparatus 100, according to an exemplary embodiment of the present invention. As shown in FIG. 4, the controller 10 determines whether a received printing data relates to a monochromatic printing mode, at operation S10. When the received printing data does not relate to the monochromatic printing mode, the controller 10 determines whether the printing unit 50 satisfies one of the predetermined auto color registration conditions, at operation of S20. When the received printing data does not relate to the monochromatic printing mode, and the printing unit satisfies one of the auto color registration conditions, the LSU 53 scans light to the photoconductive media 55, so as to form an image on the photoconductive media 55, at operation of S30. The image formed on the photoconductive medium 60 is transferred on the printing belt, at operation of S40.

Whether the image is properly transferred, is determined at operation S50. During operation of S50, whether the image is properly transferred can be determined by scanning the image with the color registration sensor, and comparing the scanned image with a predetermined reference image. When the two images correspond to each other, or when a difference between the two images is within an allowable range, the image is determined to be properly transferred. When the image is not properly transferred, the relative locations of the single-color images, which form the image, can be adjusted with respect to a main scanning direction for image transfer and/or a transferring start point, of the photoconductive media 55, at operation of S60.

As described above, an image forming apparatus and a control method thereof perform auto color registration, depending on a mode of received printing data, thereby saving developing material, and reducing power consumption, expended during the auto color registration.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus to selectively perform an auto color registration operation, the image forming apparatus comprising:
    a printing unit comprising a plurality of photoconductive media to form a one or more single-color images, a light scanning unit (LSU) to scan light to the photoconductive media, and a conveyer belt to transfer the one or more single-color images on the plurality of photoconductive media to a predetermined location; and
    a controller, if print data is received, to control the printing unit to form the one or more single-color images on the plurality of the photoconductive media by controlling a scanning time of the LSU and transfer the one or more single-color images on the conveyer belt,
    wherein the controller determines whether the received printing data is a monochromatic image or a color image, and, if the determined results is monochromatic, controls the printing unit not to perform the auto color registration operation even if a auto color registration condition is satisfied.

2. The image forming apparatus of claim 1, wherein the printing unit comprises color registration sensor to detect the transferred image on the conveyer belt, and to compare the detected image to a reference image.

3. The image forming apparatus of claim 1, wherein the auto color registration condition comprises at least one of:
    a case where fusing temperature to fuse of the image to the printing medium does not correspond to a reference temperature, after power is applied to the image forming apparatus;
    a case where the fusing temperature does not correspond to the reference temperature when the printing unit is in a print-ready state;
    a case where the printing unit has printed more than a predetermined number of sheets of the printing medium;
    a case where a consumable material is replaced; and
    a case where a casing of the image forming apparatus is opened and then closed.

4. The image forming apparatus of claim 1, wherein the auto color registration operation comprises:
    transferring the single-color images to a predetermined location on the conveyer belt;
    and adjusting a location, to which one of the single-color images will be transferred, if the single-color image is transferred to an unintended location.

5. The image forming apparatus of claim 4, wherein the adjusting of the location where the single-color image will be transferred comprises adjusting at least one of a main scanning direction for transferring the single-color image, and a transferring start point of the single-color image.

6. The image forming apparatus of claim 1, wherein the controller performs the auto color registration operation in response to a user's requests.

7. The image forming apparatus of claim 1, wherein the printing unit employs a single pass method.

8. The image forming apparatus of claim 1, wherein the auto color registration operation comprises:
    transferring the single-color images to a predetermined location; and adjusting the relative positions of one or more of the single color images, if the transferred image is improperly formed.

9. The image forming apparatus of claim 8, wherein the adjusting of the relative positions comprises adjusting at least one of a main scanning direction, and a transferring start point, of one or more of the single-color images.

10. A method of controlling an image forming apparatus comprising a printing unit comprising a plurality of photoconductive media to form a one or more single-color images, a light scanning unit (LSU) to scan light to the photoconductive media, and a conveyer belt to transfer one or more single-color images on the plurality of photoconductive media to a predetermined location and a controller, if printing data is received, to control the printing unit to form one or more single-color images on the plurality of photoconductive media by controlling a scanning time of the LSU and transfer the one or more single-color images on the conveyer belt, and selectively performs an auto color registration operation, the method comprising:
    determining whether an auto color registration condition is satisfied;
    receiving printing data;
    determining whether the received printing data is a monochromatic image or a color image; and
    if the determined result is monochromatic, controlling the printing unit not to perform the auto color registration operation, even if the auto color registration condition is satisfied.

11. The method of claim 10, further comprising:
    controlling the printing unit to performing the auto color registration operation if the determined result is a color.

12. The method of claim 11, wherein the controlling the printing unit to perform the auto color registration operation comprises transferring the single-color images to a predetermined location on the conveyer belt, and adjusting a location, to which one of the single-color images will be transferred, if the single-color image is transferred to an unintended location.

13. The method of claim 12, wherein the adjusting of the location where the image will be transferred comprises adjusting at least one of a main scanning direction for transferring the single-color image and a transferring start point of the single color image.

14. The method of claim 11, wherein the auto color registration operation is performed according to a user's request.

15. The method of claim 11, wherein the performing of the auto color registration operation comprises:
    detecting the transferred image on the conveyer belt;
    comparing the detected image to a reference image;
    adjusting the relative positions of one or more of the single-color images, if the detected image differs from the reference image.

16. The method of claim 15, wherein the adjusting of the relative positions comprises adjusting at least one of a main scanning direction, and a transferring start point, of the one or more single-color images.

17. The method of claim 10, wherein the auto color registration condition comprises at least one of:
- a case where fusing temperature to fuse of the image to the printing medium does not correspond to a reference temperature, after power is applied to the image forming apparatus;
- a case where the fusing temperature does not correspond to the reference temperature when the printing unit is in a print-ready state;
- a case where the printing unit has printed more than a predetermined number of sheets of the printing medium;
- a case where a consumable material is replaced; and
- a case where a casing of the image forming apparatus is opened and then closed.

18. The method of claim 10, wherein the printing unit employs a single pass method.

19. A method of controlling an image forming apparatus comprising a printing unit comprising a plurality of photoconductive media to form a one or more single-color images, a light scanning unit (LSU) to scan light to the photoconductive media, and a conveyer belt to transfer one or more single-color images on the plurality of photoconductive media to a predetermined location and a controller, if printing data is received, to control the printing unit to form one or more single-color images on the plurality of photoconductive media by controlling a scanning time of the LSU and transfer the one or more single-color images on the conveyer belt, and selectively performs an auto color registration operation, the method comprising:
- determining whether an auto color registration condition is satisfied;
- receiving printing data;
- determining whether the received printing data is a monochromatic image or a color image; and
- if the determined result is monochromatic, controlling the printing unit not to perform the auto color registration operation even if the auto color registration condition is satisfied; and
- if determined result is color, controlling the printing unit to perform the auto color registration operation,
- wherein the auto color registration condition comprises at least one of,
  - a case where fusing temperature to fuse of the image to the printing medium does not correspond to a reference temperature, after power is applied to the image forming apparatus,
  - a case where the fusing temperature does not correspond to the reference temperature when the printing unit is in a print-ready state,
  - a case where the printing unit has printed more than a predetermined number of sheets of the printing medium,
  - a case where a consumable material is replaced, and
  - a case where a casing of the image forming apparatus is opened and then closed.

* * * * *

UNITED STATES PATENT AND TRADEMARK OFFICE
CERTIFICATE OF CORRECTION

PATENT NO. : 8,284,412 B2
APPLICATION NO. : 11/953121
DATED : October 9, 2012
INVENTOR(S) : Hyeon-seung Lee Page 1 of 1

It is certified that error appears in the above-identified patent and that said Letters Patent is hereby corrected as shown below:

Title Page, Item (30) (Foreign Application Priority Data); Line 1; Delete "(KE)" and insert -- (KR) --, therefor.

Signed and Sealed this
Seventh Day of May, 2013

Teresa Stanek Rea
*Acting Director of the United States Patent and Trademark Office*